United States Patent [19]
Mente et al.

[11] Patent Number: 5,093,412
[45] Date of Patent: Mar. 3, 1992

[54] MACROMERS FOR GRAFT POLYOLS AND THE POLYOLS PREPARED THEREFROM

[75] Inventors: Donald C. Mente, Grosse Ile; John E. Davis, Woodhaven; Steven D. Gagnon, Detroit; Duane A. Heyman, Monroe, all of Mich.

[73] Assignee: BASF Corporation, Parsippany, N.J.

[21] Appl. No.: 397,315

[22] Filed: Aug. 23, 1989

[51] Int. Cl.$^5$ ............................................. C08G 18/30
[52] U.S. Cl. .................................. 524/762; 524/765; 525/452; 525/455; 525/920; 528/75; 560/25; 560/26; 560/158
[58] Field of Search ................ 524/762, 765; 525/452, 525/455, 920; 528/75; 560/25, 26, 158

[56] References Cited

U.S. PATENT DOCUMENTS

| | | | |
|---|---|---|---|
| 4,390,645 | 6/1983 | Hoffman et al. | 521/137 |
| 4,514,552 | 4/1985 | Shay et al. | 525/223 |
| 4,579,911 | 4/1986 | D'Sidocky et al. | 526/301 |

*Primary Examiner*—Maurice J. Welsh
*Assistant Examiner*—Rachel Johnson
*Attorney, Agent, or Firm*—William G. Conger

[57] ABSTRACT

Macromers for use in preparing stable, low viscosity graft polymer polyols of high solids content are disclosed. These macromers are easily made in high yield with short cycle times, and may be used to prepare graft dispersions containing amine based polyols.

23 Claims, No Drawings

MACROMERS FOR GRAFT POLYOLS AND THE POLYOLS PREPARED THEREFROM

BACKGROUND OF THE INVENTION

1. Field of the Invention

The subject invention pertains to novel macromers for the preparation of graft polyether polyols. Such graft polyether polyols have extensive uses in polyurethane technology.

2. Description of the Related Art

Graft polyether polyols are prepared by the in situ polymerization of one or more unsaturated monomers in a polyether polyol. Acrylonitrile and styrene are the most commonly used monomers. If appreciable polymer content and low viscosity are desirable, the polyol must contain a dispersion stabilizer. This latter is the true graft polyol and exerts a steric effect between the dispersed polymer phase and the continuous polyol phase which helps maintain the dispersed phase in suspension. Thus the graft polyol acts as a steric stabilizer. See, for example, *Dispersion Polymerization in Organic Media*, K. Barrett, Ed., John Wiley & Sons c1975, especially at pages 74ff and 130ff.

Macromers which are useful as the starting material for stabilizers may be prepared, for example, as taught in U.S. Pat. No. 4,550,194. In this reference polyether polyol having hydroxyl termination is reacted with maleic or fumaric acid or one of their derivatives, preferably maleic anhydride. Any maleate unsaturation is isomerized to fumarate, and the acid group present in the half ester formed from the reaction may be removed by capping with an alkylene oxide, reducing the acid number of the polyol to zero or thereabouts. The resultant unsaturation-containing polyether polyol is termed a macromonomer or a macromer. Upon addition of one or more unsaturated monomers, vinylic polymers become grafted onto the macromer, forming dispersion stabilizers having the attributes of both vinyl polymers and polyether polyols. At the same time the dispersion stabilizer is being formed from reaction of the vinyl monomer(s) with the macromer, polymerization of the vinyl monomers proceeds, forming the polymer dispersed phase. Using this technology, graft polymer dispersions having low viscosities and polymer contents above 50 weight percent may be prepared, particularly when a reaction moderator is also present.

However, the preparation of the macromer presents certain difficulties. First, the cycle time is quite long, typically from 15-30 hours. This results in inefficient use of expensive production equipment. Second, the preparation of the macromer is very sensitive to contamination. For this reason, macromers derived from polyols having amine functionality, for example polyoxyalkyenepolyamines, or polyols containing traces of amines, are difficult to make by prior art processes. The prior art macromers generally also have relatively high viscosities, for example, greater than 7000 cP. This higher viscosity may cause a concomittant increase in the viscosity of the graft polyol prepared therefrom. In general, lower viscosity polyols are easier to process when preparing polyurethanes. Finally, the conventional macromer synthesis is inefficient, yielding a macromer containing only about 50-70 percent of the theoretical induced unsaturation, with the remainder undergoing dimer and higher oligomer formation through Michael addition reactions.

In U.S. Pat. No. 4,581,418, are disclosed reactive ethylenically unsaturated moieties of the formula $$X-CHR_1=CHR_2$$

which may be reacted with polyether or polyester polyols by virtue of a reactive group X which may be, by way of example, carboxylic acid or anhydride, epoxy, or isocyanate, with isocyanates, for example isocyanatoethylmethacrylate, being preferred. However, the use of such compounds to induce unsaturation into the polyol creates unsaturation-containing-macromers which are chemically very reactive and which must be used directly after preparation. There is no possibility, for example, of preparing a large batch of macromer and then utilizing it as the need arises.

SUMMARY OF THE INVENTION

It would be desirable to be able to prepare macromers suitable for graft dispersion stabilizers by a process involving short cycle times, high yields and which is capable of being used with a variety of base polyols. It would further be desirable if the resulting macromer were of low viscosity, and storage stable over extended periods. These and other desirable objectives have now been unexpectedly met by novel macromers prepared by the reaction of an at least monofunctional hydroxyl-terminated polyether polymer, for example, a polyether or polyester polyol, with an aryl or arylaliphatic isocyanate containing aliphatic unsaturation on the aromatic ring. The macromers so prepared are of low viscosity and are stable with respect to time.

DESCRIPTION OF THE PREFERRED EMBODIMENTS

The macromers of the subject invention contain induced unsaturation, which may be defined as unsaturation which is purposefully added to a base polyol by reacting the base polyol with a molecule having both ethylenic unsaturation as well as a functional group capable of reacting with the reactive functionality of the base polyol. In the subject invention, the functional group of the unsaturation-containing compound is an aryl- or arylaliphatic isocyanate. The ethylenic unsaturation is attached to the aryl ring of these isocyanates. Induced unsaturation may be distinguished from other types of unsaturation which may be incidentally or accidentally present.

The isocyanates useful in the preparation of the macromers of the subject invention are selected from the group consisting of aryl isocyanates and arylaliphatic isocyanates which also contain aliphatic unsaturation on the aryl system. These isocyanates correspond to the formulae:

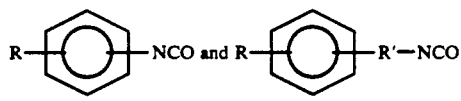

wherein R is an unsaturated aliphatic group, for example, a substituted or unsubstituted allyl, methallyl, propenyl, isopropenyl or vinyl group and wherein R' is a $C_1-C_6$ alkylene group, preferably a substituted or unsubstituted methylene group. Preferably, R' is a 2,2-propylene (dimethylmethylene) group. Most preferably, the isocyanate is 1-(t-butylisocyanato)-3-isopropenylbenzene,

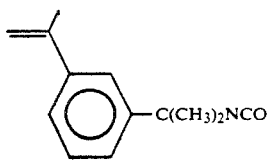

The aryl ring may optionally be substituted with non-reactive groups, for example, alkyl groups or alkoxy groups.

The polyol is preferably a conventional polyether or polyester polyol having on the average at least one hydroxyl group per molecule. The polyol may be monomeric, for example, glycerine, propylene glycol, sorbitol, etc., or may be polymeric. Preferred polymeric polyols are the products prepared by the oxyalkylation of an initiator molecule having one or more active hydrogens. Such polyether polyols and their processes of manufacture are well known to those skilled in the art.

Reaction of the ethylenically unsaturated aryl or arylaliphatic isocyanates with the polyol is generally accomplished at from 50°–100° C., preferably from 65°–85° C. generally in the presence of a catalyst which promotes the reaction of isocyanate and hydroxyl groups, such as dioctyltindiacetate or dibutyltindilaurate. In the case of polyols, as opposed to monols, the mole equivalents of hydroxyl groups are generally in substantial excess, for example at NCO/OH equivalent ratios of from 1:2 to about 1:20, preferably 1:4 to about 1:8.

In the case of monomeric polyols such as glycerine which have at least two vicinal hydroxyl groups, these may be converted to the corresponding ketal, reacted with the ethylenically unsaturated aryl or arylaliphatic isocyanate, and then hydrolyzed. Thus, according to the process of the subject invention, macromers may be prepared which have molecular weights ranging from very low to very high.

A distinct advantage of the subject invention is that macromers may be prepared from polyols derived from oxyalkylated amines and even polyols which have amino functionality rather than hydroxyl. Thus, polyoxyalkylene-polyamines may be used to prepare the macromer, in such cases the isocyanate reacting with the amino groups to form urea linkages rather than urethane linkages. When amino functional polyols are utilized in the traditional process, preparation of suitable graft polyols has proven to be difficult. In the specification and in the claims, the term "polyol" is used in its broad sense in the polyurethane art as being a compound with one or more hydrogens reactive with the isocyanate group, whether hydroxyl functional, amine functional, or otherwise. A further advantage of the subject invention is that macromer and graft polyol may be prepared in a one-pot procedure without isolating the macromer as is done with conventional syntheses.

To prepare graft polyols from the macromer, the macromer is used as is or diluted with additional conventional polyol such that the resulting mixture has generally less than 0.1 mole of induced unsaturation per mole of polyol. Preparation of such graft polyols may be by a continuous or batch process, preferably in the presence of a reaction moderator. Except for the use of the novel macromer, the graft polyol process is conventional, as disclosed, for example, in U.S. Pat. Nos. 4,454,255; 4,458,038; 4,661,531; 4,689,354; and 4,690,956, all of which are herein incorporated by reference. The graft polyols produced by the subject process are useful in the manufacture of polyurethane articles, particularly polyurethane flexible foams.

The invention is illustrated by the following examples.

EXAMPLE 1

Macromer Preparation

To a stirred reaction vessel was charged 228 g of a polyoxypropylated trimethylolpropane initiated polyol having a hydroxyl number of approximately 26.6 and a 4.8 percent polyoxyethylene cap; 5.0 grams 1-(t-butylisocyanato)-3-isopropenylbenzene [TMI, 1-(1-isocyanato-1-methylethyl)-3-(1-methylethenyl)benzene] was charged over 0.33 hours. To the vessel, prior to charging the TMI, was added 0.1 g T-12 catalyst (dibutyltindilaurate). The vessel was heated to 75°–85° C. under nitrogen and stirred until the isocyanate IR peak disappeared, generally over a period of from one to three hours. Following reaction, the catalyst was deactivated with 0.1 g benzoylchloride. Viscosity of the product was 1720 cP.

EXAMPLES 2–5

Macromer Preparation

In like manner, macromers were prepared using various mole equivalent ratios, temperatures, and catalyst levels. Addition of TMI to the polyol used in Example 1 occurred over a 20 minute period. The results are summarized in Table I.

TABLE I

| Example | Equivalent Ratio TMI: Polyol | Reaction Temperature, C. | Catalyst, Parts per 100 Parts Reactants | Reaction Time, Minutes | Viscosity, (cP) | Unsaturation, mole/mole polyol |
|---|---|---|---|---|---|---|
| 1 | 1:6 | 75 | .021 | 180 | 1720 | 0.5 |
| 2 | 1:8 | 65 | .032 | 180 | 1635 | 0.4 |
| 3 | 1:8 | 85 | .032 | 120 | 1610 | 0.4 |
| 4 | 1:4 | 65 | .032 | 180 | 1725 | 0.7 |
| 5 | 1:4 | 85 | .032 | 120 | 1710 | 0.7 |
| A | — | — | — | ~540 | 7000 | 0.5 |

COMPARATIVE EXAMPLE A

A conventional macromer was prepared by reacting maleic anhydride and the same polyol as used in Examples 1–5, in the manner taught by U.S. Pat. No. 4,550,194. Following reaction, the polyether-ester polyol was reacted with ethylene oxide to reduce the acid number. Total reaction time is approximately nine hours. About 0.8 equivalents of maleic anhydride are required to prepare a polyol having approximately 0.5 moles unsaturation per mole of polyol, indicating that 0.3 moles have disappeared by Michael addition or other addition reactions. The macromer has a viscosity of approximately 7000 cP. This macromer is listed in Table I as Example A.

EXAMPLE 6

Graft Polyol Preparation

A graft polymer dispersion was prepared as taught by U.S. Pat. No. 4,458,038. Charged to a pyrex reaction kettle were 159.8 grams of a glycerine initiated polyoxypropylene/polyoxyethylene heteric polyether capped with propylene oxide, and having a hydroxyl number of about 50; and 20.3 grams of the macromer of Example 1. A free radical polymerization initiator feed mixture was prepared from 1.95 grams VAZO ® 67 (2,2'-azobis[2-methylbutanenitrile]) dissolved in an additional 234.0 grams of the same polyol, of which 181.5 grams were actually utilized during the course of the reaction. The reaction moderator consisted of 3.0 grams dodecanethiol dissolved in the monomer feed of 200.0 grams styrene and 100.0 grams acrylonitrile, of which 242.4 grams were used in the process.

The kettle was heated to about 125° C., and maintained at this temperature, ±2.5° C. during the course of monomer mix and polyol polymerization initiator mix addition which occurred over a period of approximately 4.5 hours. Following monomer addition, the mixture was allowed to react for an additional 0.5 hours following which the mixture was vacuum stripped to 0.4 torr at 125° C. A stabilizer package in an amount of 0.675 grams and containing phenyldiisodecylphosphite and butylated hydroxytoluene in a 1:2 ratio was then added. The resulting polyol was a smooth, white, stable 40% solids, 2:1 sytrene/acrylonitrile dispersion having a low viscosity of 4590 cP.

EXAMPLE 7

Nitrogen Containing Graft

To a reaction kettle was charged 180.0 grams of a polyoxypropylene polyol initiated with 1,2-diaminocyclohexane and having a 15% by weight polyoxyethylene cap. The hydroxyl number of the polyol was 26.4. To the stirred polyol at 75° C. was added 0.3 grams TMI, and the mixture maintained at that temperature for one hour. No urethane addition catalyst was required. To the macromer thus prepared was added, as in example 6, 240 g of a 2:1 styrene/acrylonitrile mixture containing 2.4 g dodecanethiol reaction moderator. The free radical polymerization initiator for the vinyl addition polymerization comprised 2.4 g VAZO ® 67 dissolved in an additional 180.0 grams of the same diaminocyclohexane polyol used to prepare the macromer. Total addition time was 4 hours followed by 0.5 hours to allow charges to fully reset. Following stripping under vacuum and addition of 0.67 grams of the stabilizer package, the smooth white 40% solids product had a viscosity of 17,320 cP.

EXAMPLE 8

One-Pot Synthesis

To a glass reactor was added 180 g of the polyol utilized in Example 1. After heating to 75°-85° C., 2.5 g TMI and 0.1 g T-12 catalyst were added over a 2 minute period and then reacted for one hour. To the stirred solution were added, over a period of 210 minutes, 180 g additional polyol containing 2.4 g VAZO ® 67 and a monomer mixture of 160 g styrene and 80 g acrylonitrile containing 2.4 g dodecanethiol as reaction moderator. After processing as in Example 7, the resultant graft polymer dispersion was a white fluid having a solids content of 40 weight percent and a viscosity of 10,000 cP.

The embodiments of the invention in which an exclusive privilege or property is claimed are defined as follows:

1. A storage stable macromer containing induced unsaturation and suitable for the preparation of graft polymer polyol dispersions, prepared by the process comprising:

a) reacting an aliphatically unsaturated aryl or arylaliphatic isocyanate having a formula

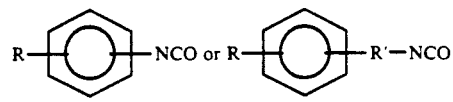

wherein R is an ethylenically unsaturated aliphatic hydrocarbon radical, and R' is a $C_1$-$C_6$ alkylene radical; with b) a polyol having two or more isocyanate-reactive hydrogens.

2. The macromer of claim 1 wherein R is selected from the group consisting of vinyl, propenyl, isopropenyl, allyl, and methallyl groups.

3. The macromer of claim 2 wherein said aliphatically unsaturated arylaliphatic isocyanate is 1-(1-isocyanato-1-methylethyl)-3-(1-methylethenyl)benzene.

4. The macromer of claim 3 wherein said polyol contains one or more hydroxyl groups.

5. The macromer of claim 3 wherein said polyol contains one or more amine groups.

6. In a process for preparing a stable, low viscosity graft polymer polyol dispersion in the presence of a macromer containing induced unsaturation, one or more ethylenically unsaturated monomers, a free radical polymerization initiator for vinyl addition, and a reaction moderator, the improvement comprising employing as a macromer, a storage stable macromer containing induced unsaturation and suitable for the preparation of graft polymer polyol dispersions, prepared by the process comprising:

a) reacting an aliphatically unsaturated aryl or arylaliphatic isocyanate having a formula

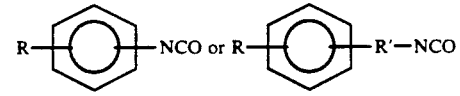

wherein R is an ethylenically unsaturated aliphatic hydrocarbon radical, and R' is a $C_1$-$C_6$ alkylene radical; with b) a polyol having one or more isocyanate-reactive hydrogens.

7. The process of claim 6 wherein R is selected from the group consisting of vinyl, propenyl, isopropenyl, allyl, and methallyl groups.

8. The process of claim 6 wherein said aliphatically unsaturated arylaliphatic isocyanate is 1-(1-isocyanato-1-methylethyl)-3-(1-methylethenyl)benzene.

9. The process of claim 6 wherein said ethylenically unsaturated monomers are selected from the group consisting of styrene, 4-methylstyrene, α-methylstyrene, acrylonitrile, methacrylonitrile, and mixtures thereof.

10. The process of claim 7 wherein said ethylenically unsaturated monomers are selected from the group consisting of styrene, 4-methylstyrene, α-methylstyrene, acrylonitrile, methacrylonitrile, and mixtures thereof.

11. The process of claim 8 wherein said ethylenically unsaturated monomers are selected from the group consisting of styrene, 4-methylstyrene, α-methylstyrene, acrylonitrile, methacrylonitrile, and mixtures thereof.

12. The process of claim 9 wherein said ethylenically unsaturated monomers are selected from the group consisting of styrene, acrylonitrile, and mixtures thereof, and are present in an amount such as to provide from 10 to about 70 weight percent solids relative to the total graft polymer polyol dispersion weight.

13. The process of claim 10 wherein said ethylenically unsaturated monomers are selected from the group consisting of styrene, acrylonitrile, and mixtures thereof, and are present in an amount such as to provide from 10 to about 70 weight percent solids relative to the total graft polymer polyol dispersion weight.

14. The process of claim 11 wherein said ethylenically unsaturated monomers are selected from the group consisting of styrene, acrylonitrile, and mixtures thereof, and are present in an amount such as to provide from 10 to about 70 weight percent solids relative to the total graft polymer polyol dispersion weight.

15. A stable, low viscosity graft polymer polyol dispersion, prepared by the process of claim 6.

16. A stable, low viscosity graft polymer polyol dispersion, prepared by the process of claim 7.

17. A stable, low viscosity graft polymer polyol dispersion, prepared by the process of claim 8.

18. A stable, low viscosity graft polymer polyol dispersion, prepared by the process of claim 9.

19. A stable, low viscosity graft polymer polyol dispersion, prepared by the process of claim 10.

20. A stable, low viscosity graft polymer polyol dispersion, prepared by the process of claim 11.

21. A stable, low viscosity graft polymer polyol dispersion, prepared by the process of claim 12.

22. A white stable, low viscosity graft polymer polyol dispersion, prepared by the process of claim 13.

23. A white stable, low viscosity graft polymer polyol dispersion, prepared by the process of claim 14.

* * * * *